United States Patent [19]

Schweizer et al.

[11] Patent Number: 5,246,592
[45] Date of Patent: Sep. 21, 1993

[54] METHOD AND APPARATUS FOR RECOVERING OIL FROM THE SURFACE OF A BODY OF WATER

[75] Inventors: Richard W. Schweizer, Sugar Land; Kantilal P. Patel, Houston, both of Tex.

[73] Assignee: ACS Industries, Inc., Woonsocket, R.I.

[21] Appl. No.: 882,807

[22] Filed: May 14, 1992

[51] Int. Cl.$^5$ .......................... C02F 1/40; E02B 15/04
[52] U.S. Cl. ................................... 210/708; 210/752; 210/799; 210/199; 210/202; 210/259; 210/538; 210/923; 210/DIG. 5
[58] Field of Search ............... 210/708, 710, 749, 752, 210/773, 776, 799, 800, 199, 201, 202, 203, 207, 209, 259, 253, 538, 540, DIG. 5, 923, 925

[56] References Cited
U.S. PATENT DOCUMENTS

| | | | |
|---|---|---|---|
| 3,738,492 | 6/1973 | Trillich | 210/DIG. 5 |
| 3,948,767 | 4/1976 | Chapman | 210/DIG. 5 |
| 4,400,280 | 8/1983 | Larsson et al. | 210/DIG. 5 |
| 4,512,901 | 4/1985 | Kozar | 210/799 |
| 4,597,874 | 7/1986 | Francis, Jr. | 210/708 |
| 4,650,581 | 3/1987 | Angles et al. | 210/DIG. 5 |
| 4,824,555 | 4/1989 | Paspek et al. | 210/708 |
| 5,023,002 | 6/1991 | Schweizer et al. | 210/710 |

Primary Examiner—Christopher Upton
Attorney, Agent, or Firm—Salter, Michaelson & Benson

[57] ABSTRACT

An apparatus for recovering oil from an oil spill on the surface of a body of water includes a skimmer unit for recovering an oil-water mixture from the surface of the body of water, a three stage coalescer unit for separating the oil in the oil-water mixture from the water therein and a solvent injection assembly for injecting solvent into the coalescer unit after the first and second stages in order to reduce the viscosity of the oil entering the second and third stages. The first, second, and third stages of the coalescer unit comprise interceptors having a surface area ratios between 27 and 65 ft$^2$/ft$^3$; 65 ft$^2$/ft$^3$ and 2500 ft$^2$/ft$^3$; and 500 ft$^2$/ft$^3$ and 4200 ft$^2$/ft$^3$, respectively.

12 Claims, 1 Drawing Sheet

METHOD AND APPARATUS FOR RECOVERING OIL FROM THE SURFACE OF A BODY OF WATER

BACKGROUND AND SUMMARY OF THE INVENTION

The instant invention relates to the recovery of oil from oil spills on the surfaces of bodies of water and more particularly to a method and apparatus for recovering oils, such as those containing high viscosity residual oil fractions, from the surfaces of bodies of water.

The assignee's U.S. Pat. No. 5,023,002 to Schweizer et al, which issued in June of 1991, disclosed one of the first effective methods and apparatus for recovering oil from oil spills on the surfaces of bodies of water. Specifically, the Schweizer et al patent disclosed a method and apparatus in which an oil-water mixture can be quickly and effectively separated into essentially pure oil and pure water outlet streams utilizing a multi-stage coalescer unit. More specifically, the aforementioned Schweizer et al patent disclosed the concept of adding an oil-based solvent to an oil-water mixture recovered from the surface of a body of water in order to reduce the viscosity of the oil in the oil-water mixture to a level which permits the oil-water mixture to be effectively separated in an oil-water coalescer without causing the coalescer to become fouled or clogged. However, despite the fact that the method and apparatus disclosed in the aforementioned Schweizer et al U.S. patent have been found to be extremely effective for separating the oil in an oil-water mixture recovered from an oil spill from the water recovered therewith, it has been found that in some instances, particularly when dealing with crude oils having extremely high viscosity residual oil fractions, it can be impractical to add sufficient quantities of solvent to make it possible to process an oil-water mixture in an oil-water coalescer. For example, it has been found that in some instances it is impractical to carry sufficient quantities of solvent on board a marine vessel operating on the surface of a body of water in order to process an oil-water mixture containing a high viscosity residual oil fraction in a continuous on-board operation wherein separated water is returned to the body of water.

The instant invention represents a significant improvement over the previously known methods and apparatus by providing an effective method and apparatus which is operative for separating an oil-water mixture recovered from the surface of a body of water into essentially pure oil and pure water streams without the use of excessive quantities of solvent. Specifically, the instant invention provides an effective method and apparatus wherein an oil-water mixture recovered from the surface of a body of water is pre-treated in a first stage oil-water coalescer containing an interceptor having an extremely low surface area ratio so as to enable it to be utilized as a first stage processing unit for processing an oil-water mixture without first adding a solvent to reduce the viscosity of the oil therein.

Accordingly, the apparatus of the instant invention comprises means for continuously withdrawing a feed oil-water mixture from the surface of a body of water, and a first stage coalescer section for receiving the feed oil-water mixture and for separating it into a first oil outlet stream and a first reduced oil-water mixture stream. The first stage coalescer section comprises an interceptor having a surface area ratio between approximately 27 square feet per cubic foot and 65 square feet per cubic foot. The first stage oil-water coalescer section preferably comprises a corrugated plate vane-type coalescer comprising a plurality of spaced corrugated vanes. In this regard, it has been found that a first stage coalescer section of this type is capable of effectively processing oil-water mixtures containing oils having extremely high viscosity residual oil fractions without becoming fouled or plugged. It has been further found that a first stage coalescer section of this type is capable of separating out a large percentage of the oil in an oil-water mixture so that the first reduced oil-water mixture stream only contains a relatively small quantity of oil. The apparatus of the subject invention further comprises means for adjusting the viscosity of the oil in the first reduced oil-water mixture, preferably by adding a solvent thereto, and a second stage coalescer section for processing the first reduced oil-water mixture. The second stage coalescer section preferably comprises an interceptor, such as a wire mesh, having a surface area ratio between approximately 65 square feet per cubic foot and 2500 square feet per cubic foot, so that it is capable of effectively separating the first reduced oil-water mixture stream into a second oil outlet stream and a second reduced oil-water mixture stream which only contains a very small quantity of oil. The apparatus preferably still further comprises a third stage oil-water coalescer section and means for adjusting the viscosity of the oil in the second reduced oil-water mixture stream to a level below approximately 80 centipoise so that the second reduced oil-water mixture stream can be effectively processed in the third stage oil-water coalescer section without causing the third stage oil-water coalescer section to become clogged or fouled. The third stage oil-water coalescer section preferably comprises an interceptor having a surface area ratio between approximately 500 square feet per cubic foot and 4200 square feet per cubic foot, and it is operative for separating the second reduced oil-water mixture stream into substantially pure oil and pure water outlet streams.

Accordingly, the method of the subject invention is carried out by continuously withdrawing a feed oil-water mixture from the surface of a body of water, continuously passing the feed oil-water mixture through the first stage oil-water coalescer section to separate the feed oil-water mixture into a first oil outlet stream and a first reduced oil-water mixture stream, and adjusting the viscosity of the oil in the first reduced oil-water mixture stream to a level below approximately 80 centipoise. The viscosity adjusted first oil-water mixture stream is then passed through a second stage oil-water coalescer section to separate the viscosity adjusted first reduced oil-water mixture stream into a second oil outlet stream and a second reduced oil-water mixture stream, and the oil in the second reduced oil-water mixture stream is adjusted to a viscosity level of below approximately 80 centipoise. The viscosity adjusted second reduced oil-water mixture stream is then passed through the third stage oil-water coalescer section in order to separate the viscosity adjusted second reduced oil-water mixture stream into a third oil outlet stream and a water outlet stream. The viscosity of the oil in the first reduced oil-water mixture stream, and the viscosity of the oil in the second reduced oil-water mixture stream are preferably adjusted by adding a hydrophobic hydrocarbon oil solvent thereto. The first stage oil-water coalescer section preferably has a surface area ratio between approximately 27 square feet per cubic foot and 65 square feet per cubic foot; the second stage oil-water coalescer section preferably has a surface area ratio between approximately 65 square feet per cubic foot and 2500 square feet per cubic foot; and the third stage oil-water coalescer section preferably has a surface area ratio between approximately 500 square feet per cubic foot and 4200 square feet per cubic foot. The first stage oil-water coalescer section preferably comprises a corrugated plate vane-type coalescer which is designed so that it is operative for separating a high viscosity oil from water without clogging or fouling.

It has been found that the method and apparatus of the instant invention can be effectively utilized for separating oil recovered from the surface of a body of water from water recovered with the oil. Specifically, it has been found that the first stage oil-water coalescer section is capable of effectively separating most of the oil recovered from the surface of a body of water from the water recovered therewith without fouling or clogging. Further, it has been found that by adding a solvent to the first reduced oil-water mixture stream from the first stage oil-water coalescer section it is possible to reduce the viscosity of the oil therein to a level which enables the first reduced oil-water mixture stream to be processed in the second and third stage coalescer sections. Still further, it has been found that by adding further solvent to the second reduced oil-water mixture stream from the second stage oil-water coalescer section in order to assure that the viscosity of the oil in the second reduced oil-water mixture is below approximately 80 centipoise, it is possible to effectively process the second reduced oil-water mixture stream so as to produce essentially pure oil and water streams from the third stage oil-water coalescer section. Still further, it has been found that because the solvent is only added to the first and second reduced oil-water mixture streams, rather than to the feed inlet stream, the process can be carried out with a minimal amount of solvent. As a result, the apparatus of the subject invention can be effectively utilized on board a vessel navigating on a body of water for cleaning up an oil spill on the surface of body of water.

Accordingly, it is a primary object of the instant invention to provide an improved apparatus for recovering a hydrophobic, hydrocarbon oil from the surface of a body of water.

Another object of the instant invention is to provide an effective method of recovering a hydrophobic, hydrocarbon oil from the surface of a body of water.

An even still further object of the instant invention is to provide an effective oil-water coalescer apparatus for recovering a hydrophobic, hydrocarbon oil from the surface of a body of water utilizing a minimal amount of hydrocarbon solvent.

An even still further object of the instant invention is to provide an effective apparatus which can be practically mounted and operated on a vessel navigating on a body of water for separating an oil-water mixture recovered from an oil spill on the body of water.

Other objects, features and advantages of the invention shall become apparent as the description thereof proceeds when considered in connection with the accompanying illustrative drawing.

DESCRIPTION OF THE DRAWINGS

In the drawing which illustrates the best mode presently contemplated for carrying out the present invention.

DESCRIPTION OF THE INVENTION

Figure 1:
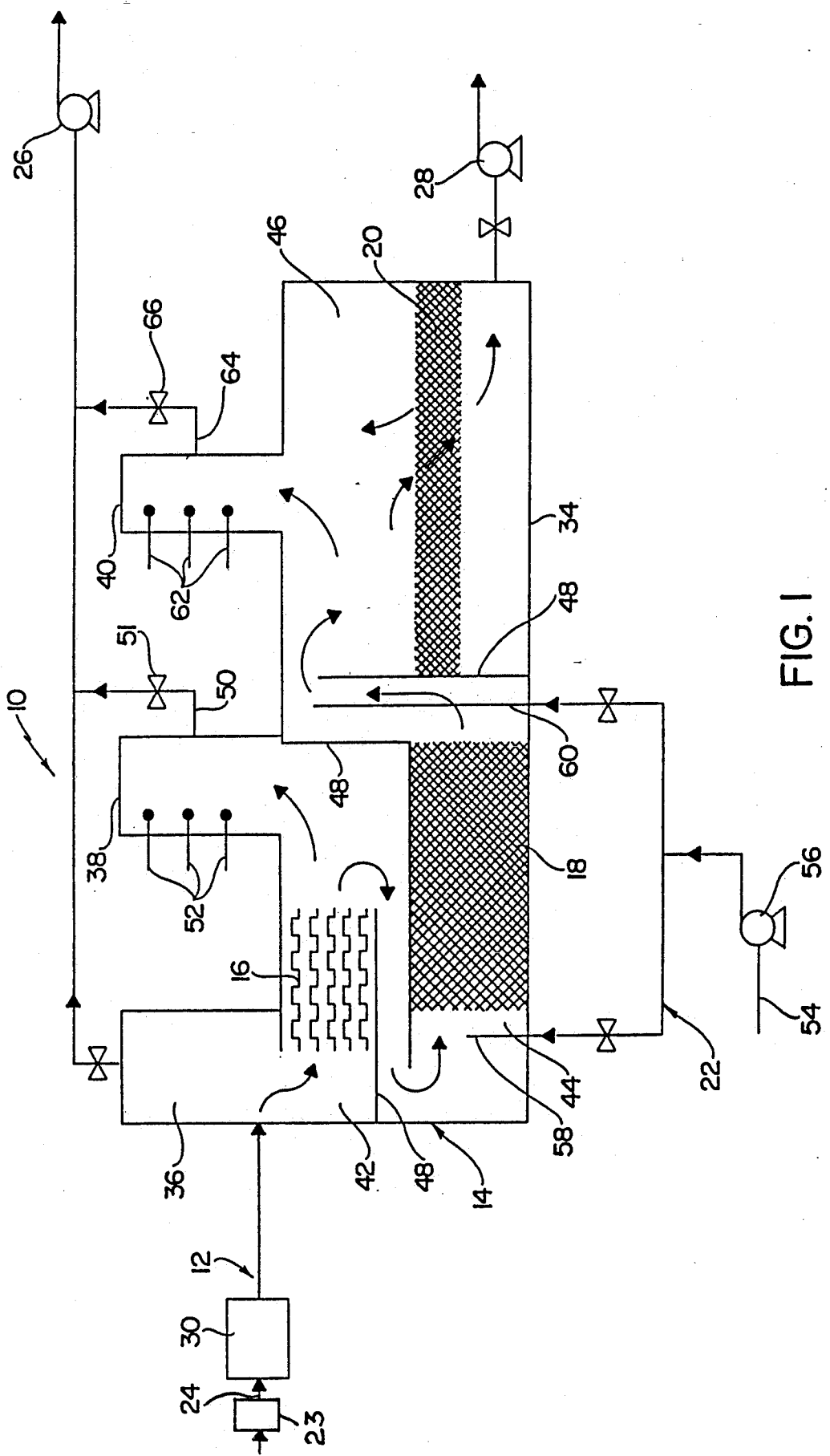
FIG. 1 is a schematic view of the apparatus of the instant invention.

Referring now to the drawing, the apparatus of the instant invention is illustrated in FIG. 1 and generally indicated at 10. The apparatus 10 comprises a feed assembly generally indicated at 12, and a common housing generally indicated at 14 which is operative for housing a first stage coalescer section generally indicated at 16, a second stage coalescer section generally indicated at 18, and a third stage coalescer section generally indicated at 20. The apparatus 10 further comprises a solvent injection assembly generally indicated at 22. The apparatus 10, which is normally adapted to be mounted onboard a vessel capable of navigating on the surface of a body of water, is operative for recovering a feed oil-water mixture stream utilizing an oil skimmer 23 which feeds a feed line 24. The apparatus 10 is further operative for separating the feed oil-water mixture stream into a substantially pure oil outlet stream which is withdrawn through an oil pump 26, and a substantially pure water outlet stream which is withdrawn through a water pump 28. The feed assembly 12 comprises the skimmer 23 which is of conventional construction and adapted for use on a vessel which is capable of navigating on a body of water, so that the skimmer is operative for recovering an oil-water mixture from an oil spill on the body of water. The feed assembly 12 further comprises the feed line 24 and a conventional inlet filter 30 which receives the oil-water mixture from the feed line 24.

The housing 14 comprises an enlarged main portion 34 and three reduced upper portions or boots 36, 38, and 40. The main portion 34 is divided into first, second, and third housing sections 42, 44, and 46, respectively, by a plurality of inner baffles 48 which direct the main flow of water and oil through the housing 14 so that it passes sequentially through the first, second, and third coalescer sections 16, 18, and 20, respectively, in the first, second, and third housing sections 42, 44, and 46, respectively. The upper sections or boots 36, 38, and 40 are adapted for recovering oil from the housing 14 so that it can be withdrawn through the oil pump 26.

The first section 42 is operative for receiving an oil-water mixture from the pump 32, so that most of the oil-water mixture passes through the first stage coalescer section 16, but so that any oil which is naturally separated from the water in the inlet oil-water mixture floats upwardly into the first boot 36 where it can be withdrawn through the oil outlet pump 26.

The first stage coalescer section 16 comprises a low surface are a coalescer interceptor having a surface area ratio between approximately 27 square feet per cubic foot and 65 square feet per cubic foot, so that it is capable of processing oil-water mixtures containing oils comprising relatively high viscosity residual oil fractions without clogging. Consequently, the first stage coalescer section 16 is operative for separating a substantial quantity of the oil in the oil-water feed mixture from the water therein to produce an essentially pure oil outlet stream and a first reduced oil-water mixture stream having a substantially reduced oil level. The first stage coalescer section preferably comprises a corrugated metal plate vane-type coalescer, although the use of coarse mesh materials for the interceptor in the first stage coalescer section 16 is also contemplated. The oil outlet stream from the first stage oil-water coalescer section 16 normally flows upwardly into the second boot 38 so that it can be withdrawn through an outlet line 50 and a valve 51. The second boot 38 includes a plurality of interface probes 52 for sensing the level of the oil water interface in the second boot 38 to enable an essentially pure oil stream to be withdrawn therefrom through the line 50. Conventional controls (not shown) can be operatively connected to the probes 52 for controlling the valve 51 in order to control the withdrawal of oil through the line 50 in a conventional manner.

The first reduced oil-water mixture stream from the first stage coalescer section 16 is directed by the baffles 48 so that it flows into the second housing section 44 and passes through the second stage coalescer section 18. The second stage coalescer section 18 preferably comprises a conventional coalescer mesh material, such as polytetrafluoroethylene and wire or fiberglass and wire, having a surface area ratio of between approximately 65 square feet per cubic foot and 2500 square feet per cubic foot. Accordingly, the second stage coalescer section 18 is operative for separating the oil and water in the first reduced oil-water mixture stream so that only a very small quantity of oil remains in the second reduced oil-water mixture stream from the second stage coalescer section 18.

The solvent section 22 comprises a solvent line 54 which is operative for transporting a hydrophobic hydrocarbon solvent, such as diesel fuel, from a solvent storage tank to a solvent pump 56, so that the solvent is then fed to either a first solvent inlet line 58 which extends into the second housing section 44, or to a second solvent line 60 which extends into the third housing section 46. In any case, the solvent which is injected through the solvent section 22 has viscosity of less than approximately 80 centipoise at the temperature of the oil-water mixture and it is fed into the appropriate section 44 or 46 at a rate which is sufficient to reduce the viscosity of the oil in the corresponding oil-water mixture to a level below approximately 80 centipoise. In this regard, whenever the feed oil-water mixture from the line 24 contains high viscosity oil components, solvent injection into the second housing section 44 through the first solvent inlet line 58 is generally essential to reduce the viscosity of the oil in the oil-water mixture stream at this point to a level which enables the oil-water mixture stream to pass through the second stage coalescer unit 18 without causing clogging thereof. It has been found that the viscosity of the oil in the oil-water mixture entering the second stage coalescer section 18 must be below approximately 80 centipoise in order for it to be passed through the second stage coalescer section 18 which has a surface area ratio of between approximately 65 square feet per cubic foot and 2500 square feet per cubic foot without causing clogging. It has been further found that it is even more critical for the oil in the oil-water mixture entering the third stage coalescer section 20 to have a viscosity of less than approximately 80 centipoise. In this regard, it has been found that since mixing may not always be perfect between the solvent entering through the line 58 and the oil in the oil-water mixture entering the second stage coalescer section 18, it is frequently also advantageous to add solvent to the oil-water mixture entering the third stage coalescer section 20 through the solvent line 60 in order to prevent clogging in the third stage coalescer section 20.

The outlet from the second stage coalescer section 18 consists of an oil-water mixture stream and an oil stream which are separated by an interface so that the oil stream floats upwardly into the third boot 40. A plurality of interface sensors 62 is provided in the third boot 40 for detecting the level of the interface between the oil and the oil-water mixture, and an outlet 64 which is controllable with a valve 66 is provided for withdrawing oil from the third boot 40. Again, suitable control means may be connected to the sensors 62 and the valve 66 for automatically controlling the flow of oil outwardly through the outlet line 64.

The oil-water mixture entering the third housing section 46 passes through the third stage coalescer section 20 in order to effect the final separation between the water and the oil. The third stage coalescer section 20 preferably comprises a fine mesh coalescer section comprising a mesh such as polytetrafluoroethylene and wire, or fiberglass and wire, having a surface area ratio of between approximately 500 square feet per cubic foot and 4200 square feet per cubic foot. The oil-water mixture stream from the second stage coalescer section 18 passes downwardly through the third stage coalescer section 20 so that oil particles collecting in the third stage coalescer section 20 float upwardly into the third boot 40, and so that only pure water passes completely through the third stage coalescer section 20. The water from the third stage coalescer section 20 is then exhausted through the water outlet pump 28.

It is seen therefore that the apparatus of the instant invention can be effectively utilized for practicing the method of the invention. Specifically, the first stage coalescer section 16 can be effectively utilized for separating substantial quantities of the oil in the oil-water feed mixture from the water therein so, that most of the oil can be drawn off through the outlet line 50. The first reduced oil-water mixture stream from the first stage coalescer section 16 is then mixed with solvent from the solvent line 58 and the resultant mixture is then passed through the second stage coalescer section 18. The oil passing outwardly from the outlet end of the second stage coalescer section 18 floats upwardly so that it can be drawn off through the discharge line 64 in the third boot 40, and the oil-water mixture from the second coalescer section 18 is further mixed with solvent from the solvent line 60, so that the resultant viscosity adjusted reduced oil-water mixture stream can be further processed in the third stage coalescer section 20. Oil separated from the water in the third stage coalescer section 20 floats upwardly so that it can be drawn off through the outlet line 64 with the oil from the second stage coalescer section 18, and water from the third stage coalescer section 20 is withdrawn through the water outlet pump 28.

EXAMPLE I

In a specific application of the method of the subject invention a test unit similar to the apparatus 10 was operated at a 400 GPM feed rate for treating an oil-water mixture, containing water and between 5% and 50% of No. 6 oil having a viscosity of approximately 11,000 centistokes, which was drawn from an oil spill on the surface of a body of water through a suction line rather than an actual skimmer. As the oil-water mixture was passed through the first stage coalescer section 16, a substantial quantity of the No. 6 oil was separated from the water and withdrawn through the line 50. The oil content in the reduced oil-water mixture leaving the first stage coalescer section 16 varied from between 95 PPM and 850 PPM. One GPM of diesel fuel having a viscosity of well below 80 centipoise at the temperature of the oil-water mixture was injected into the reduced oil-water mixture entering the second stage coalescer section 18 through the solvent line 58. This gave a concentration of approximately 2,500 PPM of diesel oil in the reduced oil-water mixture stream which reduced the viscosity of the oil in the reduced oil-water mixture stream to less than approximately 80 centistokes. No additional diesel oil was injected after the second stage coalescer section 18 during this test. In any event, it was found that the water leaving the apparatus 10 through the pump 28 had an oil concentration of less than approximately 15 PPM.

EXAMPLE II

In a similar test an oil-water mixture stream containing water and between approximately 5% and 50% of No. 6 oil was fed to a unit similar to the apparatus 10 at a flow rate of between 250 GPM and 500 GPM. The No. 6 oil in the feed oil-water mixture stream had a viscosity in the range of between 11,000 centistokes and 50,000 centistokes. However, initially the apparatus was operated without adding a solvent, such as diesel oil, to either the reduced oil-water mixture stream entering the second stage coalescer section 18 or the further reduced oil-water mixture stream entering the third stage coalescer section 20. Initially, the apparatus operated effectively and the outlet water had an oil concentration of less than approximately 15 PPM. However, after two days of running the second and third stage coalescer sections 18 and 20, respectively, became sufficiently fouled with high viscosity oil that the oil in the water outlet stream increased to well above 15 PPM and the overall capacity of the unit was significantly reduced. Thereafter, the unit was operated with diesel oil injection at a rate of 1 GPM to the inlet to the second stage coalescer section 18 in an attempt to clean the second and third stage coalescer sections 18 and 20, respectively, during continued operation. The diesel oil had a viscosity of well below 80 centipoise and after several hours the oil content in the water outlet from the apparatus was reduced to below approximately 15 PPM. However, the unit was only capable of operating at approximately half capacity because of the high viscosity residues which had built up in the second and third stage coalescer sections 18 and 20 while operating without diesel oil solvent injection.

EXAMPLE III

In a third test an apparatus similar to the apparatus 10 was operated at a feed rate of approximately 500 GPM of an oil-water mixture stream containing between 5% and 50% of No. 6 oil. The No. 6 oil had a viscosity of 18,700 centistokes and diesel oil solvent having a viscosity of well below 80 centipoise at the temperature of the oil-water mixture was added at a rate of 1 GPM to the inlet to the second stage and at a rate of 1 GPM to the inlet of the third stage. The unit ran effectively over a prolonged period of time and in all cases the oil in the water outlet was less than 15 PPM.

It is seen therefore that instant invention provides an effective method and apparatus for recovering and processing oil from the surface of a body of water. The apparatus 10 is capable of processing oil-water mixture streams at relatively high flow rates and for separating the oil in oil-water mixture streams from the water therein in order to produce essentially pure oil and water outlet streams. Further, the apparatus 10 is capable of operating with relatively low solvent injection rates, since solvent is normally only added to the inlet to the second stage coalescer section 18 and/or the inlet to the third stage coalescer section 20, rather than being added directly to the inlet of the first stage coalescer section 16. Hence, it is seen that the apparatus and method of the instant invention are capable of effectively separating oil, including high viscosity residual oils and/or crude oils, from water at a relatively high flow rate with minimal solvent injection rates. Accordingly, it is seen that the method and apparatus of the instant invention represents significant advancements in the art relating to oil separation technology which have substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of recovering a hydrophobic hydrocarbon oil from the surface of a body of water, said body of water having a water temperature, said oil having a specific gravity which is less than the specific gravity of the water in said body of water and a viscosity which is greater than approximately 80 centipoise at said water temperature, said method comprising the steps of:
   a. continuously withdrawing a feed oil-water mixture from the surface of said body of water;
   b. continuously passing said feed oil-water mixture through a first stage oil-water coalescer to separate said feed oil-water mixture into a first oil outlet stream and a first reduced oil-water mixture stream, said first stage oil-water coalescer comprising an interceptor having a surface area ratio between approximately 27 ft$^2$/ft$^3$ and 65 ft$^2$/ft$^3$;
   c. continuously adjusting the viscosity of the oil in said first reduced oil-water mixture stream to a level below approximately 80 centipoise to form an adjusted first reduced oil-water mixture stream; and
   d. continuously passing said adjusted first reduced oil-water mixture stream through a second stage oil-water coalescer to separate said adjusted first reduced oil-water mixture stream into a second oil outlet stream and a second reduced oil-water mixture stream said second stage coalescer having a surface area ratio of at least approximately 65 ft$^2$/ft$^3$.

2. The method of claim 1, further comprising the steps of continuously maintaining the viscosity of the oil in said second reduced oil-water mixture stream at a level below approximately 80 centipoise to form an adjusted second reduced oil-water mixture stream and continuously passing said adjusted second reduced oil-water mixture stream through a third stage oil-water coalescer to separate said adjusted second reduced oil-water mixture stream into a third oil outlet stream and a water outlet stream.

3. In the method of claim 1, said adjusting step comprising continuously adding a hydrophobic hydrocarbon solvent to at least a portion of said first reduced oil-water mixture stream to form said adjusted first reduced oil-water mixture stream, said solvent having a viscosity of less than approximately 80 centipoise at said water temperature and a specific gravity which is less than the specific gravity of the water in said first reduced oil-water mixture stream, said solvent being added at a rate sufficient to reduce the viscosity of the oil in said portion of said first reduced oil-water mixture stream to below approximately 80 centipoise, said continuously passing step further comprising separating the oil and solvent in said adjusted first reduced oil-water mixture stream from the water in said adjusted first reduced oil-water mixture stream.

4. In the method of claim 1, said second stage oil-water coalescer comprising an interceptor having a surface area ratio between approximately 65 $ft^2/ft^3$ and 2500 $ft^2/ft^3$.

5. In the method of claim 2, said second stage oil-water coalescer comprising an interceptor having a surface area ratio between approximately 65 $ft^2/ft^3$ and 2500 $ft^2/ft^3$, said third stage oil-water coalescer comprising an interceptor having a surface area ratio between approximately 500 $ft^2/ft^3$ and 4200 $ft^2/ft^3$.

6. In the method of claim 1, said first stage oil-water coalescer comprising a corrugated plate vane-type coalescer.

7. An apparatus for recovering a hydrophobic hydrocarbon oil from a source of oil on the surface of a body of water, said body of water having a water temperature, said oil having a specific gravity which is less than the specific gravity of the water in said body of water and a viscosity which is greater than approximately 80 centipoise at said water temperature, said apparatus comprising:

a. means for continuously withdrawing a feed oil-water mixture from the surface of said body of water;

b. first stage coalescer means for receiving said feed oil-water mixture and separating said feed oil-water mixture into a first oil outlet stream and a first reduced oil-water mixture stream, said first stage coalescer means comprising an interceptor having a surface area ratio between approximately 27 $ft^2/ft^3$ and 65 $ft^2/ft^3$;

c. means for adjusting the viscosity of the oil in said first reduced oil-water mixture stream to a level below approximately 80 centipoise to form an adjusted first reduced oil-water mixture;

d. second stage coalescer means for receiving said adjusted first reduced oil-water mixture stream and for separating said adjusted first reduced oil-water mixture stream into a second oil outlet stream and a second reduced oil-water mixture stream said second stage coalescer having a surface area ratio of at least approximately 65 $ft^2/ft^3$.

8. In the apparatus of claim 7, said means for adjusting comprising means for adding hydrophobic hydrocarbon solvent from a source of said solvent to said first reduced oil-water mixture stream, said solvent having a viscosity of less than approximately 80 centipoise at said water temperature and a specific gravity which is less than the specific gravity of the water in said feed oil-water mixture, said means for adding said solvent being operative for adding said solvent at a rate sufficient to reduce the viscosity of the oil in said first reduced oil-water mixture stream to below approximately 80 centipoise.

9. The apparatus of claim 7, further comprising third stage coalescer means for receiving said second reduced oil-water mixture stream from said second stage coalescer means and for separating said second reduced oil-water mixture stream into a third oil outlet stream and a water outlet stream.

10. The apparatus of claim 9, further comprising means for adjusting the viscosity of the oil in said second reduced oil-water mixture stream to a level below approximately 80 centipoise.

11. In the apparatus of claim 7, said second stage coalescer having a surface area ratio between approximately 65 $ft^2/ft^3$ and 2500 $ft^2/ft^3$.

12. In the apparatus of claim 9, said third stage coalescer having a surface area ratio between approximately 500 $ft^2/ft^3$ and 4200 $ft^2/ft^3$.

* * * * *